(12) United States Patent
Chen et al.

(10) Patent No.: US 9,877,019 B2
(45) Date of Patent: Jan. 23, 2018

(54) METHOD OF FILTER-UNIT BASED IN-LOOP FILTERING

(75) Inventors: Ching-Yeh Chen, Taipei (TW);
Chih-Ming Fu, Hsinchu (TW);
Chia-Yang Tsai, New Taipei (TW);
Yu-Wen Huang, Taipei (TW);
Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 792 days.

(21) Appl. No.: 13/825,061

(22) PCT Filed: Dec. 31, 2011

(86) PCT No.: PCT/CN2011/085170
§ 371 (c)(1),
(2), (4) Date: Mar. 19, 2013

(87) PCT Pub. No.: WO2012/092841
PCT Pub. Date: Jul. 12, 2012

(65) Prior Publication Data
US 2013/0215959 A1    Aug. 22, 2013

Related U.S. Application Data

(60) Provisional application No. 61/429,313, filed on Jan. 3, 2011, provisional application No. 61/498,949, filed
(Continued)

(51) Int. Cl.
*H04N 7/26* (2006.01)
*H04N 19/117* (2014.01)
(Continued)

(52) U.S. Cl.
CPC ..... *H04N 19/00066* (2013.01); *H04N 19/117* (2014.11); *H04N 19/46* (2014.11); *H04N 19/70* (2014.11); *H04N 19/82* (2014.11)

(58) Field of Classification Search
CPC ........... H04N 19/00066; H04N 19/117; H04N 19/46; H04N 19/70; H04N 19/82
(Continued)

(56) References Cited

U.S. PATENT DOCUMENTS 6,301,299 B1 * 10/2001 Sita .......................... G09G 5/39
348/714
7,379,501 B2    5/2008 Lainema
(Continued)

FOREIGN PATENT DOCUMENTS

CN        1615645 A      5/2005
CN     101502118 A      8/2009
(Continued)

OTHER PUBLICATIONS

Chujoh et al "Block-Based Adaptive Loop Filter", 35. VCEG Meeting; 85. MPEG Meeting; Jul. 16, 2008-Jul. 18, 2008; Berlin; (Video Coding Experts Group of ITU-T SG.16), Jul. 17, 2008, XP030003583 ISSN: 0000-0096.*
(Continued)

*Primary Examiner* — Gims Philippe
*Assistant Examiner* — Stefan Gadomski
(74) *Attorney, Agent, or Firm* — McClure, Qualey & Rodack, LLP

(57) ABSTRACT

Implementations of the invention are provided in methods for filter-unit based in-loop filtering in a video decoder and encoder. In one implementation, filter parameters are selected from a filter parameter set for each filter based on a filter index. In another implementation, the picture is partitioned into filter units according to filter unit size, which can be selected between a default size and other size. When other size is selected, the filter unit size may be conveyed using direct size information or ratio information. In another implementation, a merge flag and a merge index are used to
(Continued)

convey filter unit merge information. A method for filter-unit based in-loop filtering in a video encoder for color video is disclosed. In one embodiment, the method incorporates filter syntax in the video bitstream by interleaving the color-component filter syntax for the FUs.

10 Claims, 7 Drawing Sheets

Related U.S. Application Data on Jun. 20, 2011, provisional application No. 61/503,870, filed on Jul. 1, 2011, provisional application No. 61/549,931, filed on Oct. 21, 2011.

(51) Int. Cl.
  *H04N 19/70* (2014.01)
  *H04N 19/46* (2014.01)
  *H04N 19/82* (2014.01)

(58) Field of Classification Search
  USPC .................................................. 375/240.02
  See application file for complete search history.

(56) References Cited

U.S. PATENT DOCUMENTS

| | | | | |
|---|---|---|---|---|
| 8,116,379 B2 * | 2/2012 | Dang | .................. | H04N 19/436 375/240 |
| 8,537,895 B2 * | 9/2013 | Dang | .................. | H04N 19/436 375/240 |
| 8,885,730 B2 * | 11/2014 | Narroschke | .......... | H04N 19/423 375/240.25 |
| 9,001,899 B2 | 4/2015 | He | | |
| 9,571,861 B2 * | 2/2017 | Siekmann | ............. | H04N 19/176 |
| 2004/0076333 A1 * | 4/2004 | Zhang | .................. | H04N 19/197 382/238 |
| 2005/0213593 A1 * | 9/2005 | Anderson | .......... | H04L 29/06027 370/419 |
| 2006/0227883 A1 * | 10/2006 | Citro | .......... | G06T 5/20 375/240.29 |
| 2007/0076797 A1 | 4/2007 | Lee et al. | | |
| 2007/0189390 A1 * | 8/2007 | Pappas | ................. | H04N 19/513 375/240.16 |
| 2007/0217502 A1 | 9/2007 | Ammar et al. | | |
| 2008/0013845 A1 * | 1/2008 | Fukuhara | ............... | H04N 19/63 382/240 |
| 2008/0170615 A1 * | 7/2008 | Sekiguchi | .............. | H04N 19/70 375/240.14 |
| 2009/0129478 A1 * | 5/2009 | Meroth | ................ | H04N 19/176 375/240.24 |
| 2009/0175349 A1 * | 7/2009 | Ye | .......... | H04N 19/70 375/240.23 |
| 2009/0196342 A1 * | 8/2009 | Divorra Escoda | ..... | H04N 19/50 375/240.02 |
| 2010/0061645 A1 * | 3/2010 | Wilkins | ................ | H04N 19/50 382/238 |
| 2010/0086051 A1 | 4/2010 | Park et al. | | |
| 2010/0322303 A1 | 12/2010 | Wada et al. | | |
| 2010/0329361 A1 | 12/2010 | Choi et al. | | |
| 2012/0201311 A1 * | 8/2012 | Sole | ..................... | H04N 19/176 375/240.29 |
| 2013/0142262 A1 * | 6/2013 | Ye | ........................ | H04N 19/176 375/240.16 |
| 2015/0305648 A1 * | 10/2015 | Udupa | .................. | G01R 27/08 324/692 |
| 2017/0163982 A1 * | 6/2017 | Fu | ........................ | H04N 19/117 |

FOREIGN PATENT DOCUMENTS

| | | | | |
|---|---|---|---|---|
| CN | 101517909 A | 8/2009 | | |
| CN | 101926175 A | 12/2010 | | |
| EP | 1 841 230 | 10/2007 | | |
| EP | 2 109 322 | 10/2009 | | |
| EP | 2375747 A1 * | 10/2011 | ........... | H04N 19/147 |
| EP | 2790409 A3 * | 11/2014 | ............. | H04N 19/46 |
| KR | 10-2010-0109459 | 10/2010 | | |
| WO | WO 2013/059461 | 4/2013 | | |

OTHER PUBLICATIONS

Nakamura et al "Coding order of luma and chroma intra prediction modes" JCT-VC of ITU-T SG16 and ISO/IECT JTC1/SC29/WG11 6*th* Meeting: Torino, Jul. 14-22, 2011 Document: JCTVC-F094.*

McCann, K., et al.; "Samsung's Response to the Call for Proposals on Video Compression Technology;" Joint Collaborative Team on Video Coding (JCT-VC) of ITU-T SG16 Wp3 and ISO/IEC JTC1/SC29/WG11; Apr. 2010; pp. 1-42.

Tsai, C.Y., et al.; "TE10 subtest2—Coding Unit Synchronous Picture Quadtree-Based Adaptive Loop Filter;" Joint Collaborative Team on Video Coding (JCT-VC) of ITU-T SG16 Wp3 and ISO/IEC JTC1/SC29/WG11; Oct. 2010; pp. 1-12.

Ikai, T., et al.; "Region-Based Adaptive Loop Filter Using Two-Dimensional Feature;" Joint Collaborative Team on Video Coding (JCT-VC) of ITU-T SG16 Wp3 and ISO/IEC JTC1/SC29/WG11; Jan. 2011; pp. 1-11.

* cited by examiner

| alf_param( ) { | Descriptor |
|---|---|
|   alf_flag | u(1)\|ae(v) |
|   if( alf_flag ) { | |
|     alf_fu_size_param( ) | |
|     if( alf_fu_size_flag ) | |
|       AlfFsNum = alf_fs_num_minus1 + 1 | ue(v)\|ae(v) |
|     else | |
|       AlfFsNum = 1 | |
|     for( idx = 0; idx < AlfFsNum; idx ++ ) | |
|       alf_fs_param( idx ) | |
|     AlfFuNumW=(PicWidthInLcu+AlfFuWidthInLcu−1)/AlfFuWidthInLcu | |
|     AlfFuNumH=(PicHeightInLcu+AlfFuHeightInLcu−1)/AlfFuHeightInLcu | |
|     if( alf_fu_size_flag ) { | |
|       alf_enable_fu_merge | u(1)\|ae(v) |
|       for( j = 0; j < AlfFuNumH; j++ ) | |
|         for( i = 0; i < AlfFuNumW; i++ ) | |
|           alf_fs_selection_param( j, i ) | |
|     } | |
|   } | |
| } | |

- 210: rows from `if( alf_fu_size_flag )` through `AlfFsNum = alf_fs_num_minus1 + 1`
- 220: rows `for( idx = 0; idx < AlfFsNum; idx ++ )` and `alf_fs_param( idx )`
- 230: the two AlfFuNumW / AlfFuNumH rows
- 240: rows from `if( alf_fu_size_flag ) {` through `alf_fs_selection_param( j, i )`

Fig. 2

| | Descriptor |
|---|---|
| alf_fu_size_param( ) { | |
|   if( alf_fu_size_flag ) { | u (1)\|ae(v) |
|     if( alf_change_fu_size ) { | u(1)\|ae(v) |
|       if( alf_fu_size_syntax_mode ) { | |
|         alf_fu_width_in_lcu_minus1 | ue(v)\|ae(v) |
|         alf_fu_height_in_lcu_minus1 | ue(v)\|ae(v) |
|         AlfFuWidthInLcu = alf_fu_width_in_lcu_minus1 + 1 | |
|         AlfFuHeightInLcu = alf_fu_height_in_lcu_minus1 + 1 | |
|       } else { | |
|         alf_fu_size_ratio_minus2 | ue(v)\|ae(v) |
|         AlfRatio = alf_fu_size_ratio_minus2 + 2 | |
|         AlfFuWidthInLcu = (alf_default_fu_width_in_lcu_minus1+1)*AlfRatio | |
|         AlfFuHeightInLcu = (alf_default_fu_height_in_lcu_minus1+1)*AlfRatio | |
|       } | |
|     } else { | |
|       AlfFuWidthInLcu = alf_default_fu_width_in_lcu_minus1 + 1 | |
|       AlfFuHeightInLcu = alf_default_fu_height_in_lcu_minus1 + 1 | |
|     } | |
|   } else { | |
|     AlfFuWidthInLcu = PicWidthInLcu | |
|     AlfFuHeightInLcu = PicHeightInLcu | |
|   } | |
| } | |

- 310: alf_fu_width_in_lcu_minus1 ... AlfFuHeightInLcu = alf_fu_height_in_lcu_minus1 + 1
- 320: alf_fu_size_ratio_minus2 ... AlfFuHeightInLcu = (alf_default_fu_height_in_lcu_minus1+1)*AlfRatio
- 330: AlfFuWidthInLcu = alf_default_fu_width_in_lcu_minus1 + 1 ... AlfFuHeightInLcu = alf_default_fu_height_in_lcu_minus1 + 1
- 340: AlfFuWidthInLcu = PicWidthInLcu ... AlfFuHeightInLcu = PicHeightInLcu

Fig. 3

| | Descriptor |
|---|---|
| sao_alf_unit ( rx, ry, c ) { | |
|   if ( rx == 0 && ry > 0 ) { | |
|     repeat_row_flag [ c ] [ ry ] | u(1) |
|   } else if ( rx == 0 && ry == 0 ) { | |
|     repeat_row_flag [ c ] [ ry ] = 0 | |
|   } | |
|   if ( !repeat_row_flag [ c ] [ ry ] ) { | |
|     if ( rx == 0 \|\| run [ c ] [ ry ] [ rx ] < 0 ) { | |
|       if ( ry == 0 ) { | |
|         run [ c ] [ ry ] [ rx ] = 0 + run_diff [ c ] [ ry ] [ rx ] | |
|       } else if ( rx == NumLCUsInPicWidth - 1 ) { | |
|         run [ c ] [ ry ] [ rx ] = 0 | |
|       } else { | |
|         run [ c ] [ ry ] [ rx ] = run [ c ] [ ry-1 ] [ rx ] + run_diff [ c ] [ ry ] [ rx ] | |
|       } | |
|       if ( rx < NumLCUsInPicWidth - 1 ) { | |
|         for ( k = 0; k <= run [ c ] [ ry ] [ rx ]; k++ ) { | |
|           run [ c ] [ ry ] [ rx+k+1 ] = run [ c ] [ ry ] [ rx+k ] - 1 | |
|         } | |
|       } | |
|     if ( ry > 0 ) { | |
|       merge_up_flag [ c ] [ ry ] [ rx ] | u(1) |
|     } else { | |
|       merge_up_flag [ c ] [ ry ] [ rx ] = 0 | |
|     } | |
|     if ( !merge_up_flag [ c ] [ ry ] [ rx ] ) { | |
|       sao_alf_param ( rx, ry, c ) | |
|     } | |
|   } | |
|   } | |
| } | |

Fig. 4

| | Descriptor |
|---|---|
| sao_alf_unit( rx, ry, c) { | |
|   if ( rx == 0 && ry > 0 ) { | |
|     repeat_row_flag [ c ] [ ry ] | u(1) |
|   } else if ( rx==0 && ry == 0 ) { | |
|     repeat_row_flag [ c ] [ ry ] = 0 | |
|   } | |
|   if ( !repeat_row_flag [ c ] [ ry ] ) { | |
|     if ( rx > 0 || ry > 0 ) { | |
|       merge_flag [ c ] [ ry ] [ rx ] | u(1) |
|     } else { | |
|       merge_flag [ c ] [ ry ] [ rx ] = 0 | |
|     } | |
|     if ( merge_flag [ c ] [ ry ] [ rx ] ) { | |
|       if ( rx == 0 ) { | |
|         merge_index [ c ] [ ry ] [ rx ] = 1 // upper | |
|       } else if ( ry == 0 ) { | |
|         merge_index [ c ] [ ry ] [ rx ] = 0 // left | |
|       } else if ( upper_same_as_left ( ) ) { | |
|         merge_index [ c ] [ ry ] [ rx ] = 0 // left | |
|       } else { | |
|         merge_index [ c ] [ ry ] [ rx ] | u(1) |
|       } | |
|     } else { | |
|       sao_alf_param ( rx, ry, c ) | |
|     } | |
|   } | |
| } | |

510: if(!repeat_row_flag...) block through merge_flag assignment
520: if(merge_flag...) block through merge_index
530: sao_alf_param call

Fig. 5

METHOD OF FILTER-UNIT BASED IN-LOOP FILTERING

CROSS REFERENCE TO RELATED APPLICATIONS

The present invention claims priority to U.S. Provisional Patent Application, Ser. No. 61/429,313, filed Jan. 3, 2011, entitled "MediaTek's Adaptive Loop Filter", U.S. Provisional Patent Application, Ser. No. 61/498,949, filed Jun. 20, 2011, entitled "LCU-based Syntax for Sample Adaptive Offset", U.S. Provisional Patent Application, Ser. No. 61/503,870, filed Jul. 1, 2011, entitled "LCU-based Syntax for Sample Adaptive Offset", U.S. Provisional Patent Application, Ser. No. 61/549,931, filed Oct. 21, 2011, entitled "Filter Unit Adaptation for Adaptive Loop Filter and Sample Adaptive Offset". The U.S. Provisional Patent Applications are hereby incorporated by reference in their entireties.

TECHNICAL FIELD

The present invention relates to video processing. In particular, the present invention relates to apparatus and method for filter-unit based in-loop filtering including sample adaptive offset and adaptive loop filter.

BACKGROUND

In a video coding system, video data are subject to various processing such as prediction, transform, quantization, and deblocking. Along the processing path in the video coding system, noise may be introduced and characteristics of the processed video data may be altered from the original video data due to the operations applied to video data. For example, the mean value of the processed video may be shifted. Intensity shift may cause visual impairment or artifacts, which will become noticeable especially when the intensity shift varies from picture to picture. Therefore, the pixel intensity shift has to be carefully compensated or restored to reduce the artifacts. Some intensity offset schemes have been used in the field. For example, an intensity offset scheme, termed as sample adaptive offset (SAO), classifies each pixel in the processed video data into one of multiple categories according to a context selected. The SAO scheme usually requires incorporating SAO information in the video bitstream, such as partition information to divide a picture or slice into blocks and the SAO offset values for each block so that a decoder can operate properly. Besides SAO, adaptive loop filter (ALF) is another type of in-loop filter often applied to the reconstructed video to improve video quality. Similarly, ALF information such as partition information and filter parameters has to be incorporated in the video bitstream so that a decoder can operate properly.

In a conventional coding system, picture-level in-loop filtering is often applied, where the same filter parameters are shared by all blocks in the picture. While the picture-level in-loop filtering is simple, it lacks adaptivity to local characteristics of the picture. It is desirable to develop an in-loop filtering scheme that can adapt to local characteristics of the picture. The in-loop filtering scheme with local adaptivity may require more bandwidth to convey filter information. Accordingly, it is also desirable to develop syntax that can convey filter information efficiently and/or flexibly.

SUMMARY

Methods for filter-unit based in-loop filtering in a video decoder and encoder are disclosed. The method for filter-unit based in-loop filtering in a video decoder incorporating an embodiment according to the present invention comprises receiving a video bitstream corresponding to compressed video, wherein FU (Filter Unit) based in-loop filtering is used in a reconstruction loop associated with the compressed video; deriving reconstructed video from the video bitstream, wherein the reconstructed video is partitioned into one or more FUs; determining a filter index from the video bitstream for each of said one or more FUs; determining filter parameters from a filter parameter set according to the filter index for said each of said one or more FUs; and applying in-loop filtering to said each of said one or more FUs based on the filter parameters. In the corresponding encoder, the method incorporates the respective syntax information in the video bitstream.

In another embodiment according to the present invention, the method for filter-unit based in-loop filtering in a video decoder comprises deriving a FU size from the video bitstream; partitioning the reconstructed video into FUs according to the FU size; and applying the in-loop filtering to the FUs. A first flag may be incorporated in the video bitstream to indicate a syntax mode for incorporating FU size in the video bitstream. If the syntax mode is a direct mode, the FU size is determined according to direct size information incorporated in the video bitstream. If the syntax mode is a ratio mode, the FU size is determined according to the FU-size ratio in the video bitstream and minimum FU size. In the corresponding encoder, the method incorporates the respective syntax information in the video bitstream.

In yet another embodiment according to the present invention, the method for filter-unit based in-loop filtering in a video decoder comprises deriving a merge flag from the video bitstream for each of the FUs, wherein the merge flag indicates whether said each of the FUs is merged with a neighboring FU; receiving a merge index from the video bitstream if the merge flag indicates that said each of the FUs is merged, wherein filter parameters are determined are shared with the neighboring FU indicated by the merge index; receiving the filter parameters from the video bitstream if the merge flag indicates that said each of the FUs is not merged; and applying the in-loop filtering to said each of the FUs using the filter parameters. In the corresponding encoder, the method incorporates the respective syntax information in the video bitstream.

A method for filter-unit based in-loop filtering in a video decoder and encoder for color video is also disclosed. The method for filter-unit based in-loop filtering according to an embodiment of the present invention incorporates filter syntax in the video bitstream by interleaving the color-component filter syntax for the FUs.

BRIEF DESCRIPTION OF DRAWINGS

FIG. 1A illustrates an exemplary filter-unit partition, where the picture size is 832×480 and the filter unit size is 192×128.

FIG. 1B illustrates an exemplary filter-unit partition, where the picture size is 832×480 and the filter unit size is 384×256.

FIG. 2 illustrates an exemplary syntax design for alf_param( ) according to one embodiment of the present invention.

FIG. 3 illustrates an exemplary syntax design for alf_fu_size_param( ) according to one embodiment of the present invention.

FIG. 4 illustrates an exemplary syntax design for sao_alf_unit( ) according to one embodiment of the present invention.

FIG. 5 illustrates an exemplary syntax design for sao_alf_unit( ) according to another embodiment of the present invention.

DETAILED DESCRIPTION

In High-Efficiency Video Coding (HEVC), several in-loop filtering tools have been included to improve video quality. For example, a technique named Adaptive Offset (AO) is introduced to compensate the offset of reconstructed video and AO is applied inside the reconstruction loop. A method and system for offset compensation is disclosed in U.S. Non-Provisional Patent Application, Ser. No. 13/158,427, filed on Jun. 12, 2011, entitled "Apparatus and Method of Sample Adaptive Offset for Video Coding". The method classifies each pixel into one of multiple categories and applies intensity shift compensation or restoration to processed video data based on the category of each pixel. The above AO technique is termed as Sample Adaptive Offset (SAO). Besides SAO, Adaptive Loop Filter (ALF) has also been introduced in HEVC to improve video quality. ALF applies spatial filter to reconstructed video inside the reconstruction loop. Both SAO and ALF are considered as in-loop filtering in this disclosure.

In order to facilitate in-loop filtering, information associated with in-loop filtering process may have to be incorporated in the bitstream syntax. The syntax associated with in-loop filtering is often incorporated in a higher level, such as a sequence level or a picture level, for many blocks to share so as to reduce the bit rate for the related syntax. While incorporating the in-loop filtering information in a high level may reduce the bit rate for the related syntax, such method may not be able to quickly adapt to local variations within a picture. Some improved schemes have been reported to provide a certain degree of local adaptivity. For example, SAO may use quadtree to adaptively partition a picture or a picture area into smaller blocks and SAO is applied to each leaf block. On the other hand, ALF may use group flag to provide localization.

Figures 1A, 1B:
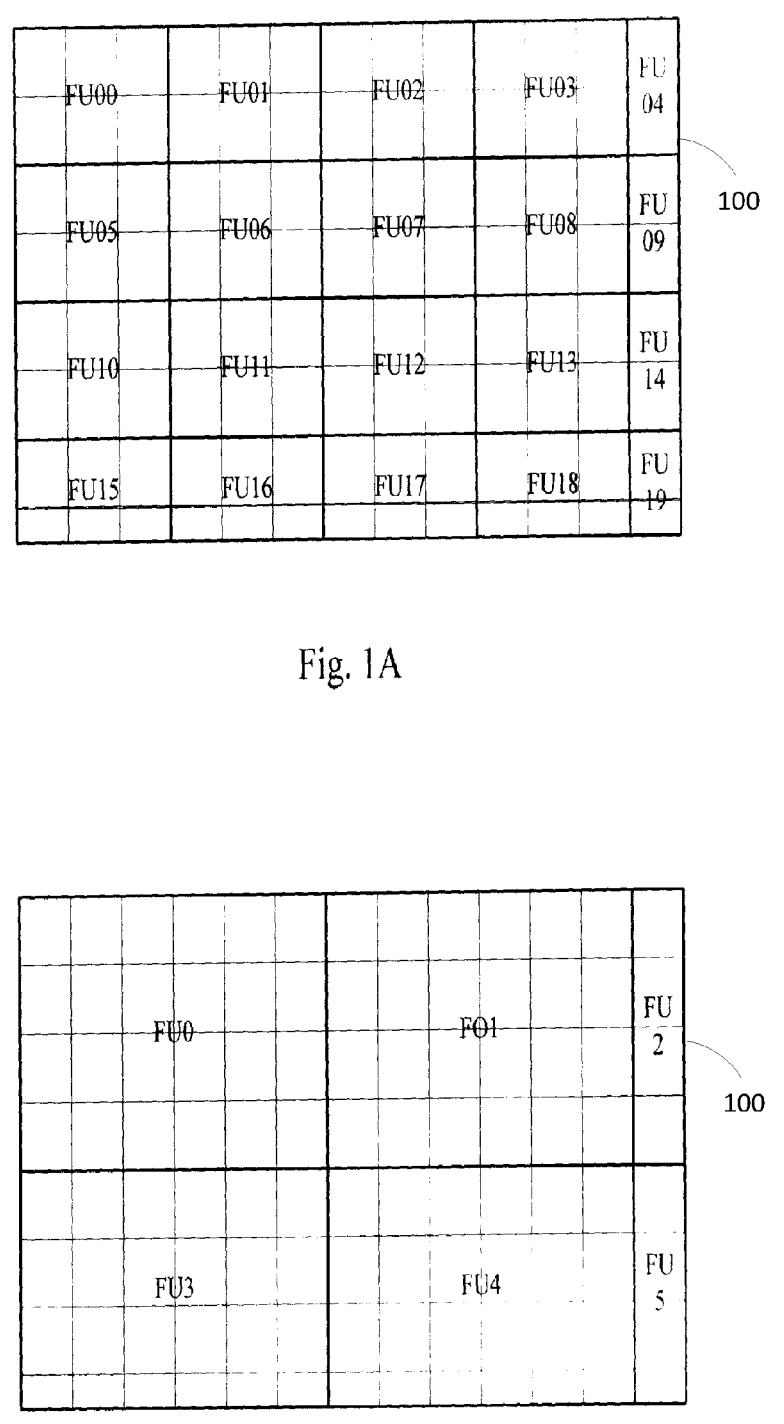
Figure 1C:
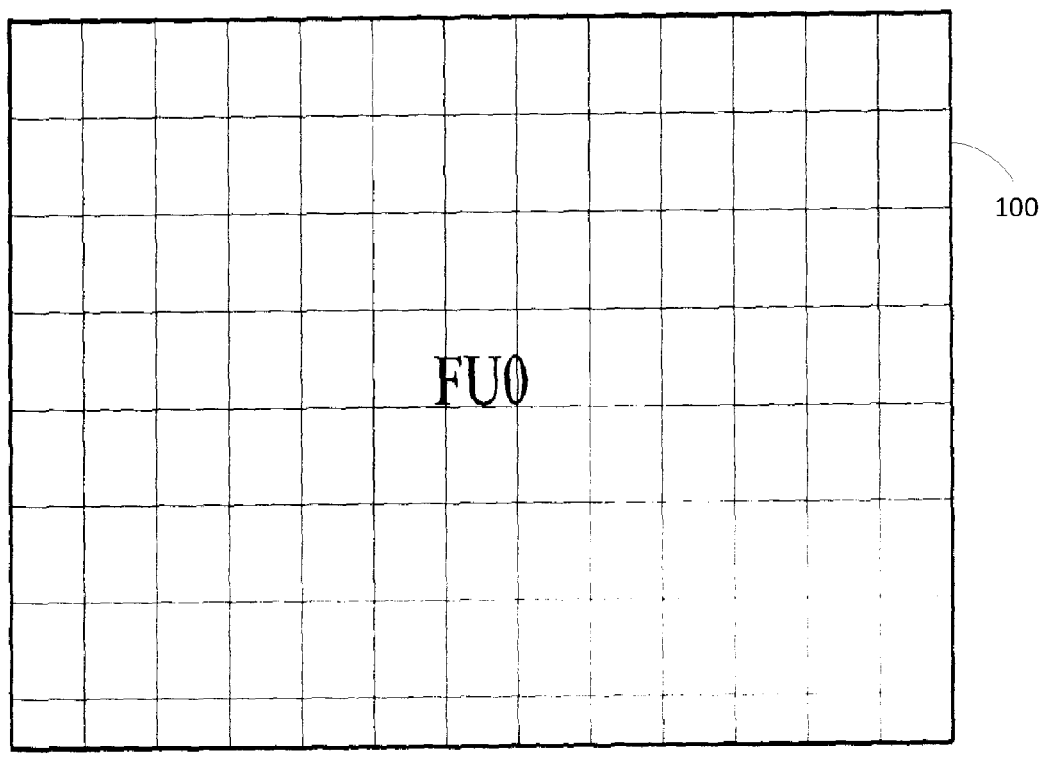
FIG. 1C illustrates an exemplary filter-unit partition, where the whole picture is treated as one filter unit.

It is desirable to develop a technique that can provide more dynamic adaptation to allow in-loop filtering process performed based on local characteristics of the picture. An embodiment according to the present invention uses filter-unit based syntax instead of picture-level syntax. Filter unit (FU) is a processing unit used for in-loop filtering process, which may be different from the coding unit (CU) used in HEVC. In U.S. Non-Provisional patent application Ser. No. 13/093,068, filed on Apr. 25, 2011, entitled "Method and Apparatus of Adaptive Loop Filtering", FU-based ALF is disclosed which allows each FU to select one of a filter set as a candidate. In one example, a picture 100 may be divided into filter units having the same size. When the picture size is not divisible according to the FU size, some FUs at the end of row/column of the picture may be smaller. FIGS. 1A-1C illustrate examples of FU partition for three different FU sizes. The picture size used in these examples is 832×480. Each small square in FIGS. 1A-1C indicates a 64×64 LCU (Largest Coding Unit) and the blocks at the bottom have a size 64×32. If the picture size and the FU size are known, the FU partition can be determined accordingly. For example, the FU size of 192×128 will result in twenty FUs as shown in FIG. 1A, where FU04, FU09 and FU14 have a size of 64×128, FU15 through FU18 have a size of 192×96, and FU19 has a size of 64×96. FIG. 1B illustrates the case where the FU has a size of 384×256. It will result in six FUs, where FU2 has a size of 64×256, FU3 and FU4 have a size of 384×224, and FU5 has a size of 64×224. FIG. 1C illustrates an example where the FU covers the whole picture 100. While the intended FU is measured by LCU in FIGS. 1A-1C, other block sizes may also be used.

After a picture 100 is divided into FUs, a filter set (also called filter parameter set) consisting of multiple candidate filters may be determined to adapt to local characteristics of the picture for the in-loop filtering process. FIG. 2 illustrates an exemplary syntax design, alf_param( ) to accommodate in-loop filter parameter for ALF. Syntax section 210 illustrates that the number of candidate filters in the filter set, AlfFsNum, is determined according to AlfFsNum=alf_fs_num_minus1+1 if FU partition is used as indicated by alf_fu_size_flag, where alf_fs_num_minus1 is a syntax element in the bitstream associated with the number of candidate filters in the filter set. Syntax section 220 illustrates that the filter parameter for each of the candidate filters is determined. The number of FUs in the picture width, AlfFuNumW and the number of FUs in the picture height, AlfFuNumH are determined in syntax section 230. Furthermore, if FU partition is enabled as indicated by alf_fu_size_flag, flag alf_enable_fu_merge is incorporated to indicate whether FU merge is allowed and a candidate filter is selected for each FU as shown in syntax section 240. Syntax design in FIG. 2 illustrates an example of using a filter index for each filter unit instead of incorporating filter parameters individually in the bitstream for each filter unit. The filter index is more bitrate efficient representation of filter information than the explicit filter parameters. A skilled person in the field may practice the present invention by modifying the syntax design shown in FIG. 2.

The FU size information may be incorporated using alf_fu_size_param( ) as shown in FIG. 3. If alf_fu_size_flag has a value of 1, it indicates that the FU partition is used. When the FU partition is used, the FU size may be indicated by a FU size change flag, alf_change_fu_size, regarding whether a default FU size or other FU size is used. In the case that FU size other than the default size is used (i.e., alf_change_fu_size=1), the exemplary syntax accommodates two alternative methods, as indicated by alf_fu_size_syntax_mode, to incorporate the FU size information. If alf_fu_size_syntax_mode has a value of 1, the FU size information is incorporated directly as shown in syntax section 310, where alf_fu_width_in_lcu_minus1 is associated with the FU width in the unit of LCU and alf_fu_height_in_lcu_minus1 is associated with the FU height in the unit of LCU. If alf_fu_size_syntax_mode has a value of 0, the FU size information is represented using FU size ratio. In this case, the FU size is equal to the product of the minimum FU size and a multiplication factor, alf_fu_size_ratio_minus2 as shown in syntax section 320. The example in FIG. 3 uses a default FU size as the minimum FU size. Syntax element, alf_default_fu_width_in_lcu_minus1 is associated with the default FU width in the unit of LCU and syntax element, alf_default_fu_height_in_lcu_minus1 is associated with the minimum FU height in the unit of LCU. If syntax element, alf_change_fu_size has a value of 0, the default FU size is used as shown in syntax section 330. If syntax element, alf_fu_size_flag has a value of 0, it indicates no FU partition and the FU size is the picture size as shown in syntax section 340. Syntax design in FIG. 3 illustrates an example of incorporating FU size information in the bitstream syntax using a direct mode or a ratio mode according to syntax mode flag (i.e., alf_fu_size_syntax_mode). A skilled person in the field may practice the present invention by modifying the syntax design shown in FIG. 3.

If FU merge is allowed, neighboring FUs having similar characteristics may share the same candidate filter in order to improve coding efficiency. One example to convey FU merge information is to transmit the number of consecutive FUs that are merged, where the number of consecutive FUs merged is termed as run. In U.S. Non-Provisional Patent Application, Ser. No. 13/311,953, filed on Dec. 6, 2011, entitled "Apparatus and Method of Sample Adaptive Offset for Luma and Chroma Components", FU merge representation based on run is disclosed. An exemplary syntax design for FU structure, sao_alf_unit(rx, ry, c) is shown in FIG. 4, wherein in-loop filtering includes SAO and ALF, rx and ry are FU horizontal index and vertical index respectively, and c indicates the color component (i.e., Y, Cb or Cr). To further improve coding efficiency, a row of FUs may share a same candidate filter. In order to conserve bit rate, a syntax element repeat_row_flag [c][ry] can be used to indicate whether the row of FUs at ry uses the same filter information or not. Syntax element run_diff [c][ry][rx] is used to indicate the number of FUs merged with the left FU.

While the exemplary syntax design in FIG. 4 illustrates a run-based representation of filter sharing for FU-based in-loop filtering, other method may also be used to represent the filter sharing. An alternative syntax design based on merge flag is illustrated in FIG. 5. Syntax element merge_flag [c][ry][rx] is used to indicate whether the FU with color component c at (rx, ry) is merged with one of its neighboring blocks. As shown in syntax section 510, syntax element merge_flag [c][ry][rx] is only incorporated when repeat_row_flag [c][ry] indicates that the row of FUs is not repeated. Furthermore, according to syntax section 510, merge_flag [c][ry][rx]=0 for rx=0 and ry=0. If merge flag [c][ry][rx] indicates the FU is merged with one of its neighboring blocks, merge index [c][ry][rx] is incorporated to indicate which of the neighboring blocks that the FU is merged with as shown in syntax section 520. When merge flag [c][ry][rx] indicates that the FU is not merged, syntax element sao_alf_param (rx, ry, c) will be incorporated to provide the filter information as shown in syntax section 530. Syntax design in FIG. 5 illustrates an example of incorporating a merge flag to indicate whether the current FU is merged and a merge index to indicate which of the neighboring FUs that the current FU is merged with. A skilled person in the field may practice the present invention by modifying the syntax design shown in FIG. 5.

Figure 6:
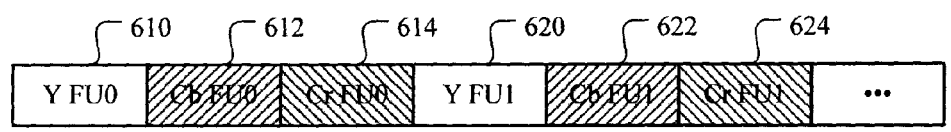
FIG. 6 illustrates an exemplary interleaved FU syntax for color video according one embodiment of the present invention.

When the picture-level in-loop filtering syntax is used, the syntax is always incorporated in the picture or a higher level. For color video, syntax in the picture level may be used to allow the picture use individual in-loop filtering information for each color component or allow the chrominance (chroma) components to share in-loop filtering information with the luminance (luma) component. The syntax of FU-based in-loop filtering for color video may incorporate information associated with the luma component for the whole picture followed by information associated with the chroma components for the whole picture. Therefore, the in-loop filtering process for a chroma FU may have to wait after information for all luma FUs of the picture has been received. In order to reduce latency, an embodiment according to the present invention utilizes interleaved syntax for color video using FU-based in-loop filtering. FIG. 6 illustrates an exemplary interleaved syntax for FU-based in-loop filtering of color video. The FU-based filter syntax is incorporated according to the FU order. For each FU, the syntax for the color components is incorporated one after the other. For example, the syntax associated with the Y component for FU0 610 is followed by the Cb component 612 and the Cr component 614. After filter syntax for all color components of FU0 is incorporated, the Y component for FU1 620 is incorporated and followed by the Cb component 622 and the Cr component 624. The syntax for remain FUs can be incorporated in the same fashion. The interleaved filter syntax in FIG. 6 shows one exemplary embodiment according to the present invention. The filter syntax is interleaved for every FU in FIG. 6. A skilled person may practice the invention by using other arrangement without departing from the spirit of the present invention. For example, the YCbCr syntax order for the three color components may be modified, such as CbCrY or YCrCb. While FIG. 6 illustrates an example of syntax interleaving for every FU, an embodiment of the present invention may implement filter syntax interleaving for multiple FUs. For example, the syntax interleaving can be perform for every two FUs, i.e., Y FU0, Y FU1, Cb FU0, Cb FU1, Cr FU0, Cr FU1, Y FU2, Y FU3, Cb FU2, Cb FU3, Cr FU2, Cr FU3, and etc.

Figure 7:
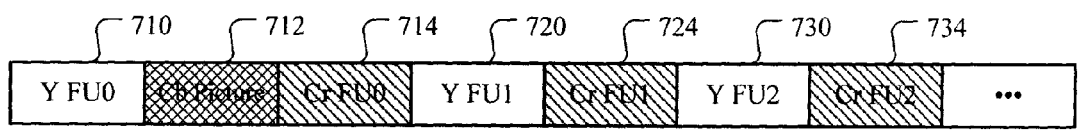
FIG. 7 illustrates an exemplary interleaved FU syntax along with a picture based in-loop filtering of a color component for color video according one embodiment of the present invention.

When FU-based in-loop filtering is allowed, a flag in the slice level, picture level or sequence level may be used to adaptively select FU-based or picture-based in-loop filtering according to a selection flag in the slice level, picture level or sequence level. In one embodiment according to the present invention, the selection flag can be used along with the filter syntax interleaving for color video. An exemplary syntax arrangement using filter syntax interleaving and selection flag is shown in FIG. 7, where the Cb component uses the picture-level in-loop filtering while the Y and Cr components use FU-based in-loop filtering. The filter syntax is incorporated according to the FU order for the Y and Cr components similar to the case mentioned in FIG. 6. The filter syntax for the Cb picture may be inserted after the filter syntax for the first FU of the Y component. Accordingly, the filter syntax arrangement becomes Y FU0 710, Cb Picture 712, Cr FU0 714, Y FU1 720, Cr FU1 724, Y FU2 730, and Cr FU2 734 as shown in FIG. 7. Alternatively, the filter syntax for Cb picture may be placed before the filter syntax for Y FU0.

Embodiment of syntax for in-loop filter according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for filter-unit based in-loop filtering in a video decoder, the method comprising:
    receiving a video bitstream corresponding to compressed color video, wherein FU (Filter Unit) based in-loop filtering is used in a reconstruction loop associated with the compressed color video, wherein reconstructed color video is partitioned into FUs, and wherein each of the FUs comprises a first color component and a second color component;
    receiving a first filter syntax associated with the first color component and a second filter syntax associated with the second color component for the FUs in the video bitstream, wherein the first filter syntax and the second filter syntax for the FUs are interleaved in the video bitstream, wherein the first filter syntax and the second filter syntax alternate in the bitstream, and both filter syntaxes for a given filter unit appear sequentially in the bitstream before filter syntaxes for another filter unit appear in the bitstream; and
    applying the in-loop filtering to the first color component associated with each of FUs according to the first filter syntax; and
    applying the in-loop filtering to the second color component associated with each of FUs according to the second filter syntax.

2. The method of claim 1, wherein the first filter syntax and the second filter syntax for the FUs are interleaved based on a single FU.

3. The method of claim 1, wherein the first filter syntax and the second filter syntax for the FUs are interleaved based on multiple FUs.

4. The method of claim 1, wherein each of the FUs comprises a third color component, wherein picture-level in-loop filtering is applied to the third color component, and a third filter syntax for to the third color component is incorporated in the bitstream.

5. A method for filter-unit based in-loop filtering in a video encoder, the method comprising:
    generating a video bitstream corresponding to compressed color video, wherein FU (Filter Unit) based in-loop filtering is used in a reconstruction loop associated with the compressed color video, wherein reconstructed color video is partitioned into FUs, and wherein each of the FUs comprises a first color component and a second color component;
    incorporating a first filter syntax associated with the first color component and a second filter syntax associated with the second color component for the FUs in the video bitstream, wherein the first filter syntax and the second filter syntax for the FUs are interleaved in the video bitstream, wherein the first color component and the second color component alternate in the bitstream, and both color components for a given filter unit appear sequentially in the bitstream before color components for another filter unit appear in the bitstream; and
    providing the video bitstream.

6. The method of claim 5, wherein the first filter syntax and the second filter syntax for the FUs are interleaved based on a single FU.

7. The method of claim 5, wherein the first filter syntax and the second filter syntax for the FUs are interleaved based on multiple FUs.

8. The method of claim 5, wherein each of the FUs comprises a third color component, wherein picture-level in-loop filtering is applied to the third color component, and a third filter syntax for to the third color component is incorporated in the bitstream.

9. The method of claim 1, wherein the first color component is a luma component (Y) and the second color component is a chroma component (Cb or Cr).

10. The method of claim 4 wherein the first color component is a luma component (Y), the second color component is a chroma component (Cb), and the third color component is a chroma component (Cr).

* * * * *